US008930278B2

(12) United States Patent
Delia et al.

(10) Patent No.: US 8,930,278 B2
(45) Date of Patent: Jan. 6, 2015

(54) METHOD AND SYSTEM OF PRESERVING PURCHASED ON-DEMAND TRANSPORTATION ENTERTAINMENT SERVICES ACROSS DIFFERENT JOURNEY SEGMENTS OR SEPARATE TRIPS

(75) Inventors: Wayne M. Delia, Poughkeepsie, NY (US); Edward E. Kelley, Wappingers Falls, NY (US); Franco Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 12/422,415

(22) Filed: Apr. 13, 2009

(65) Prior Publication Data

US 2010/0262509 A1    Oct. 14, 2010

(51) Int. Cl.
| | | |
|---|---|---|
| G06F 21/00 | (2013.01) | |
| G06F 17/30 | (2006.01) | |
| G06F 7/04 | (2006.01) | |
| G06Q 30/06 | (2012.01) | |
| G06Q 30/04 | (2012.01) | |
| G06Q 10/02 | (2012.01) | |

(52) U.S. Cl.
CPC .............. *G06Q 30/06* (2013.01); *G06Q 30/04* (2013.01); *G06Q 30/0601* (2013.01); *G06Q 10/02* (2013.01)
USPC ............................... 705/52; 707/705; 726/33

(58) Field of Classification Search
USPC .............................................. 725/87; 726/33
See application file for complete search history.

(56) References Cited

U.S. PATENT DOCUMENTS

| | | | | |
|---|---|---|---|---|
| 5,740,075 A | * | 4/1998 | Bigham et al. ................. | 709/229 |
| 5,808,660 A | * | 9/1998 | Sekine et al. ................... | 725/76 |
| 5,973,722 A | * | 10/1999 | Wakai et al. .................... | 725/76 |
| 6,499,027 B1 | * | 12/2002 | Weinberger .......................... | 1/1 |
| 7,684,428 B2 | * | 3/2010 | Habetha et al. ................ | 370/443 |
| 7,751,438 B2 | * | 7/2010 | Holierhoek et al. .......... | 370/468 |
| 7,796,056 B2 | * | 9/2010 | Fein et al. ................ | 340/995.24 |
| 2001/0055319 A1 | * | 12/2001 | Quigley et al. ............... | 370/480 |
| 2002/0166117 A1 | * | 11/2002 | Abrams et al. ................ | 717/177 |
| 2002/0170053 A1 | * | 11/2002 | Peterka et al. ................. | 725/31 |
| 2005/0066353 A1 | * | 3/2005 | Fransdonk ...................... | 725/29 |

(Continued)

FOREIGN PATENT DOCUMENTS

| | | |
|---|---|---|
| WO | WO 98/11686 | 3/1998 |
| WO | WO 2004/008277 A2 | 1/2004 |

OTHER PUBLICATIONS

"Enhancing Online Personal Connections through the Synchronized Sharing of Online Video" by David A. Shamma, et al., CHI 2008 Proceedings—Works in Progress, Apr. 5, 2008.

(Continued)

*Primary Examiner* — Alexander Kalinowski
*Assistant Examiner* — Murali Dega
(74) *Attorney, Agent, or Firm* — John A. Jordan

(57) ABSTRACT

A method and system for allowing the purchaser of an on-demand entertainment session of predetermined time duration to reaccess that portion of the session not used. On-demand passenger entertainment services in airline flights often offer services, such as movies, of a predetermined time duration which time is longer than the time of flight. The method and system disclosed allows purchasers to gain access on another flight to the unused portion of the services, such as, the unseen portion of a movie, terminated at the end of the initial flight.

13 Claims, 5 Drawing Sheets

(56) References Cited

U.S. PATENT DOCUMENTS

| | | | |
|---|---|---|---|
| 2005/0071882 A1* | 3/2005 | Rodriguez et al. | 725/95 |
| 2005/0275758 A1* | 12/2005 | McEvilly et al. | 348/725 |
| 2006/0215562 A1* | 9/2006 | Mou | 370/235 |
| 2007/0130595 A1* | 6/2007 | McElhatten et al. | 725/88 |
| 2007/0157222 A1* | 7/2007 | Cordray et al. | 725/13 |
| 2007/0174471 A1* | 7/2007 | Van Rossum | 709/229 |
| 2007/0263567 A1* | 11/2007 | Habetha et al. | 370/329 |
| 2007/0270213 A1* | 11/2007 | Nguyen et al. | 463/29 |
| 2008/0005000 A1* | 1/2008 | Radl et al. | 705/34 |
| 2008/0005770 A1* | 1/2008 | Acharya et al. | 725/101 |
| 2008/0059884 A1* | 3/2008 | Ellis et al. | 715/721 |
| 2008/0066106 A1* | 3/2008 | Ellis et al. | 725/40 |
| 2008/0101460 A1* | 5/2008 | Rodriguez | 375/240.01 |
| 2008/0133529 A1* | 6/2008 | Berkowitz et al. | 707/8 |
| 2009/0063348 A1* | 3/2009 | Sequeira | 705/50 |
| 2009/0210356 A1* | 8/2009 | Abrams et al. | 705/400 |
| 2010/0223660 A1* | 9/2010 | Scott et al. | 726/4 |
| 2010/0242079 A1* | 9/2010 | Riedl et al. | 725/115 |

OTHER PUBLICATIONS

"An Aircraft Cabin Wireless System for Games and Video Entertainment" by Dwayne Folden, et al., ACM Computers in Entertainment, vol. 5, No. 1, Art. 7, Apr. 2007.

"Headlight Prefetching for Mobile Media Streaming" by Shiowyang Wu, et al. 2007, ACM Digital Library.

* cited by examiner

US 8,930,278 B2

METHOD AND SYSTEM OF PRESERVING PURCHASED ON-DEMAND TRANSPORTATION ENTERTAINMENT SERVICES ACROSS DIFFERENT JOURNEY SEGMENTS OR SEPARATE TRIPS

BACKGROUND OF THE INVENTION

1. Field of the Invention

The present invention relates to a method and system of preserving unused time of a purchased session of on-demand entertainment where need arises to terminate the purchased entertainment session before the end of the session. More particularly, the present invention relates to method and computer apparatus for allowing unused time purchased in an on-demand entertainment system to be re-accessed for continued play of the entertainment at a later time.

2. Background and Related Art

On-demand entertainment sessions may be purchased for a variety of entertainment features. For example, on-demand entertainment for audio/video on-demand services may be purchased for current movies of predetermined/or known length sessions, music sessions of fixed length or video games of allotted time sessions. It is clear that other on-demand services may, as well, be purchased for a fixed or predetermined period of time. Such services have become prevalent in the transportations industry, particularly in the airline industry where in-flight entertainment systems allow pay-per-view movies to be purchased by individual passengers for view at the passengers' seat. Similarly, a passenger may purchase a music session or video game session of for a fixed or predetermined period of time.

One of the difficulties with such systems is that the length of the movie or game, for example, may be longer than the first segment of a multiple-segmented trip, or during the first leg of a round trip flight. In such instances, the passenger fails to view the entire movie or complete the entire game session and the remaining on-demand services purchased by the passenger are forfeited.

Such situation may be particularly annoying where the flight segment ends interrupting the movie at a particularly crucial point in a well-received movie or at a similar point in a multi-level video game. Given such, the passenger may elect not to purchase the on-demand service which tends to defeat the purpose of the service in the first place.

SUMMARY OF THE PRESENT INVENTION

In accordance with the present invention, a method and system is provided for preserving purchased on-demand entertainment services of predetermined duration where need arises, or it is desired, to discontinue the services before the end of the predetermined duration. Such system is particularly adapted to the airline industry where in-flight on-demand services offer passengers the option of purchasing on-demand entertainment, such as, films, music or video games.

The method and system of the present invention allows the purchaser of on-demand entertainment to retain any unused time portion of the purchased session for later use or play. The application system of the present invention tracks purchases of on-demand in-flight entertainment sessions by passengers. The application system also keeps track of any unused time of the sessions purchased by passengers. Where the same airline on-demand capabilities are available on a later segment of a flight itinerary, or on a return flight during a round trip event, the passenger is given the option of resuming the purchased session, such as, completing an unfinished purchased movie or video game session. The method and application system of the present invention acts to continue the movie or game at the point it was previously interrupted or stopped. Alternatively, the passenger may elect to receive a credit for any unused portion of the purchased on-demand entertainment session.

In accordance with one aspect of the invention, a method of preserving unused time of an on-demand service session by:

authorizing play of an on-demand service session of predetermined time duration using a unique identifier;

commencing play of the on-demand session of predetermined time duration;

terminating play before the end of the session of predetermined time duration;

determining the amount of unused time remaining in the session of predetermined time duration;

storing the amount of unused time remaining in a session file associated with the unique identifier; and resuming play of the unused time of the session by accessing the session file using the unique identifier.

In a further aspect of the invention, a method is provided for preserving unused time in on-demand services by:

authorizing purchase of an on-demand service session of predetermined time duration by credit card number and password;

linking the session purchased with the credit card number and password in a purchaser file in a local server;

commencing the session of predetermined time duration;

terminating the session of predetermined time duration before the end of the session of predetermined time duration;

identifying the point in time in the session of predetermined time duration when the session is terminated;

determining the amount of session time remaining in said session of predetermined time duration using the predetermined time duration of the session and the point in time in the session when the session is terminated; and storing the amount of session time remaining in the purchaser file in the local server.

In yet further aspects of the above invention:

a central server is updated from the local server with information in the purchaser file including the amount of session time remaining in said purchase file;

another local server is updated from the central server with the information in the purchaser file including the amount of session time remaining in the purchaser file; and the purchaser file is accessed in the another local server to continue play of the session time remaining in the purchaser file and wherein the local server is on a first airline flight, the another local server is on another airline flight and said central server is ground-based and updated when said first airline flight ends.

In yet further aspects of the invention a system is provided for on-demand purchase of airline flight passenger seat service including:

a passenger terminal at the passenger seat for accessing a local server on the flight for purchase of a service session of predetermined time duration using a unique identifier and wherein said local server acts to automatically terminate play of said session when the flight ends and determines the amount of any session time remaining in the session of predetermined duration and stores the time remaining in a session file with said unique identifier;

a central ground-based server linked to the local server for receiving the stored session file including any said session time remaining in said session of predetermined duration;

another local server on another airline flight linked to the central server for receiving the stored session file including any session time remaining; and a passenger terminal at a passenger seat in the another airline flight for accessing the another local server using the unique identifier to allow continued play of the session for at least a part of the amount of any session time remaining.

Further aspects of the above system wherein:

the local server and another local server are linked to a central ground-based server by wireless communication; and the local server and another local server may be the same server on different flight segments of the same aircraft.

In other aspects of the invention, a program storage device readable by a machine, tangibly embodying a program of instruction executable by a machine to perform method steps for preserving unused time in an on-demand service arrangement includes the steps of:

authorizing play of an on-demand service session of predetermined time duration using a unique identifier;

commencing play of the on-demand session of predetermined time duration;

terminating play before the end of the session of predetermined time duration;

determining the amount of unused time remaining in the session of predetermined time duration;

storing the unused time remaining in a session file associated with the unique identifier; and resuming play of the unused time remaining in the session of predetermined time duration by accessing the session file using the unique identifier.

Further aspects of the program storage device include:

authorizing the play of an on-demand service session of predetermined time duration on an airline flight;

terminating play of the on-demand service session at the end of the airline flight before the end of the session of predetermined time duration; and resuming play of the unused time remaining in the session by accessing the session file using the unique identifier to continue the session at a point in time where the session was terminated.

DETAILED DESCRIPTION OF THE DRAWINGS

The method and system of preserving unused portions of purchased on-demand services, in accordance with the present invention, acts to determine what the unused time portion of the service remains where termination of the service occurs before the end of the time period of the service. The terms "fixed" or "predetermined" time, or play time, or period of time, are used to define the limited time duration of the purchased service. The service may be any of a variety of services, such as, music or video on-demand entertainment services offering films or video games of various degrees of complexity.

Typically, such on-demand services are purchased to run over a fixed or predetermined period of time, and for a variety of reasons the purchaser may be unable to view or otherwise use the whole or complete period of time of the service so purchased. For example, the duration of an airline flight may be less than the predetermined time length of a movie and, thus, the movie play will be terminated at the end of the flight but before the end of the movie.

The method and system in accordance with the present invention preserves the time remaining in the movie play and allows the purchaser to resume play of the movie on another flight at the point the movie terminated on the previous flight. The another flight may be another flight segment of the previous flight on the same aircraft or another flight on another aircraft. Although the invention has been described by way of example, as would operate on airline flights, it is clear that the method and system could equally be applied to other forms of transportation, such as, bus or train, or in applications other than transportation.

Figure 1:
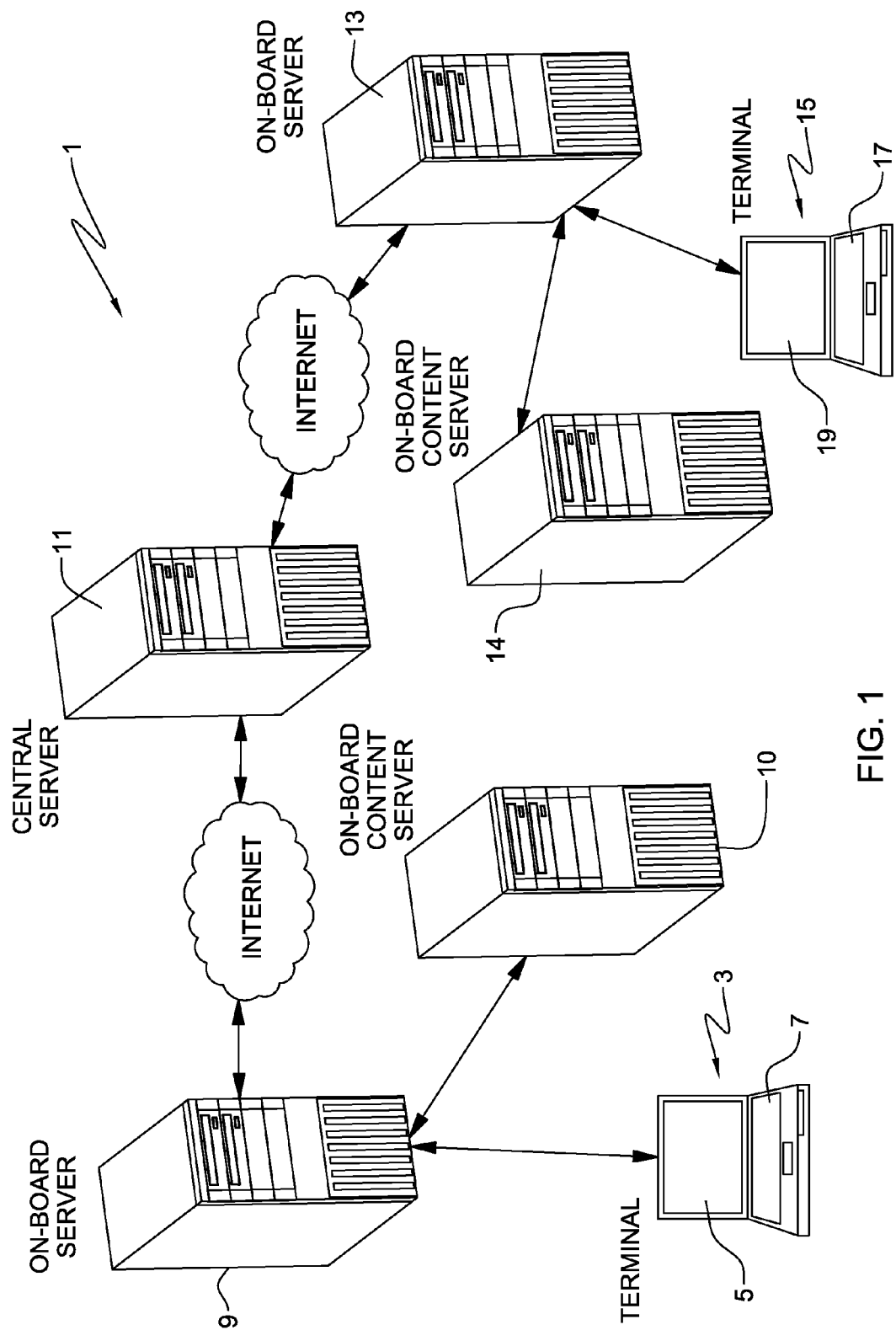
FIG. 1 shows a system hardware view of the system configuration used for preserving purchased on-demand transportation entertainment services across different journey segments or separate trips, in accordance with the present invention.

With reference to FIG. 1, there is shown a System 1 comprising a network arrangement including a typical User Terminal 3 with Screen 5 and Keyboard 7 which arrangement is an interactive terminal arrangement that may be used to initially access the on-demand service. Typically, such terminal is located at each passenger seat of a transportation vehicle, such as, a commercial aircraft. The passengers are able to peruse the on-demand services offered by an airline, for example, and make a selected purchase. For example, a list of films may be displayed on Screen 5 as provided by On-Board Server 9, whereby the passenger may select and purchase a particular film having a predetermined play time period. As used throughout the specification, the term "Server" is a conventional computer that is programmed to provide on-demand services to interactive user terminal arrangements and other computers. Thus, the terms "server" and "server computer" have the same meaning. In this regard, both On-Board Server computers 9 and 13 are programmed to provide on-demand services to user Terminals 3 and 15, respectively, as shown in FIG. 1. Both Servers are programmed to operate in the same manner.

The purchase of service may be made using a credit card number which number and other relevant information may be entered into Server 9, via Keyboard 7, for example. At the time of purchase, the purchaser may select and enter a password for later use in accessing the system to resume play of the film. It is clear that credit card readers or other forms of credit card data entry may, as well, be used.

On-Board Server 9 is used to control Terminal 3 and receive the authorization to purchase a selected service, such as, a particular film. Typically, in an aircraft such on-board server is hard-wired to the aircraft Terminal 3 at each passenger seat.

By way of example, the selected film may be two hours in duration of play. If the flight is one and half hours in duration the film will automatically terminate before the end of the film. This termination is controlled by On-Board Server 9 as a result of the flight landing operation.

The On-Board Server 9 is programmed to determine the point in the time of play of the film where play is terminated and store the time remaining of the predetermined time duration of play of the film, i.e. the unused time of the purchased predetermined time duration of play. This would apply equally to a purchased video game of predetermined time duration. The unused time, selected film, credit card number, password and other information is stored in a purchaser file in On-Board Server 9.

Whether a film or video game, the system operates under program control to resume play at the point where play was terminated. Thus, the video file of a film, for example, may be accessed either forward or backward to the point in the file where the film was terminated. The purchased content may be stored in On-Board Server 9 or in separate On-Board Content Server 10 programmed to provide the purchased content through On-Board Server 9.

As shown in FIG. 1, after the flight has landed, Server 9 acts to send the purchaser file information to ground-based Central Server 11. This updated information would typically be done by wireless network communication, such as, by way of a wireless internet link.

As further shown in FIG. 1, another On-Board Server 13 is also updated with the purchaser file information over a wireless internet link. On-Board Server 13 may be located on another aircraft used for another continuing flight by the purchaser. Alternately, it may be a return flight on another aircraft at a later time. Similarly, the purchaser may resume flight on the original aircraft with On-Board Server 9 for another segment of the original flight.

Where the purchaser resumes flight on another aircraft with On-Board Server 13, the purchaser may access the remaining unused on-demand content, such as, the remaining portion of a purchased film. This may be carried out via Terminal 15 by entering the credit card number and password from the original purchase using Keyboard 17 to access On-Board Server 13. When so accessed, On-Board Server 13 acts to resume the film or game on Screen 19 at the point where it was terminated. Where the purchased content is stored in a separate On-Board Content Server programmed to provide content, such as shown by reference character 14, On-Board Server 13 directs the Content Server 14 to begin play at the point where play terminated.

It is clear that where circumstances require it, On-Board Server 13 might terminate the film or game before completed play of the movie or game, as purchased, and would act, as On-Board Server 9 acted, to store the unused time in the purchaser file. Upon landing On-Board Server 13 would then up-date a ground-based server which, in turn, could update another on-board server on another aircraft used by the purchaser for another flight.

Figure 2:
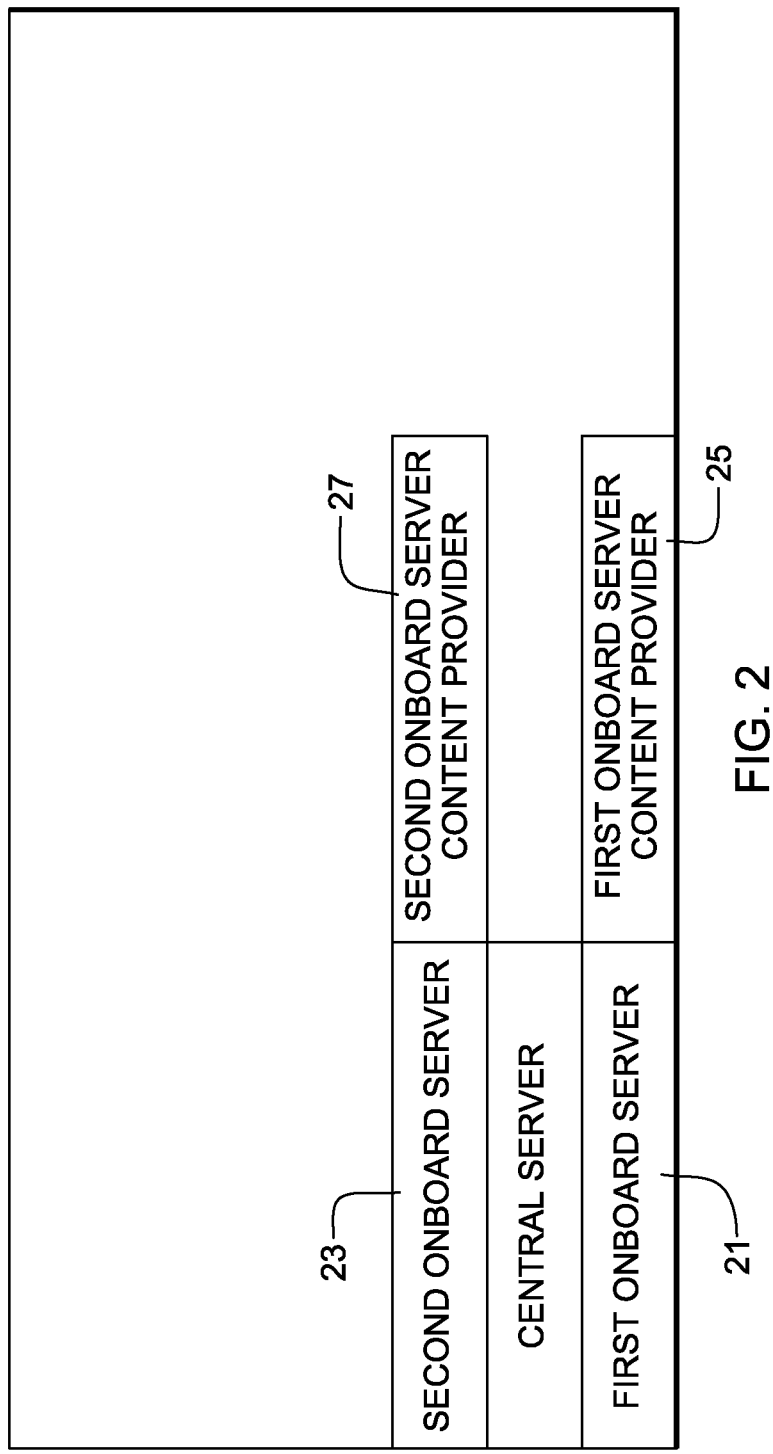
FIG. 2 shows a system software view of software content as relates to the server system configuration, in accordance with the present invention.

FIG. 2 shows the relationship of servers and purchased content. It is clear the On-Board Servers 21 and 23 may act as content provides or may act to control other Servers 25 and 27, acting as content providers. It is also clear that each of the servers providing content must contain the same content offered by the on-demand service. Thus, Servers 25 and 27, for example, must contain the same content.

The on-board servers may be any of a variety of computers such as, PC systems, microprocessors or other known computer systems used as servers. Terminals 3 and 17 may be any basic interactive terminal arrangement which may be connected in a wired network arrangement under control of On-Board Servers 9 and 13, respectively.

Figure 3A:
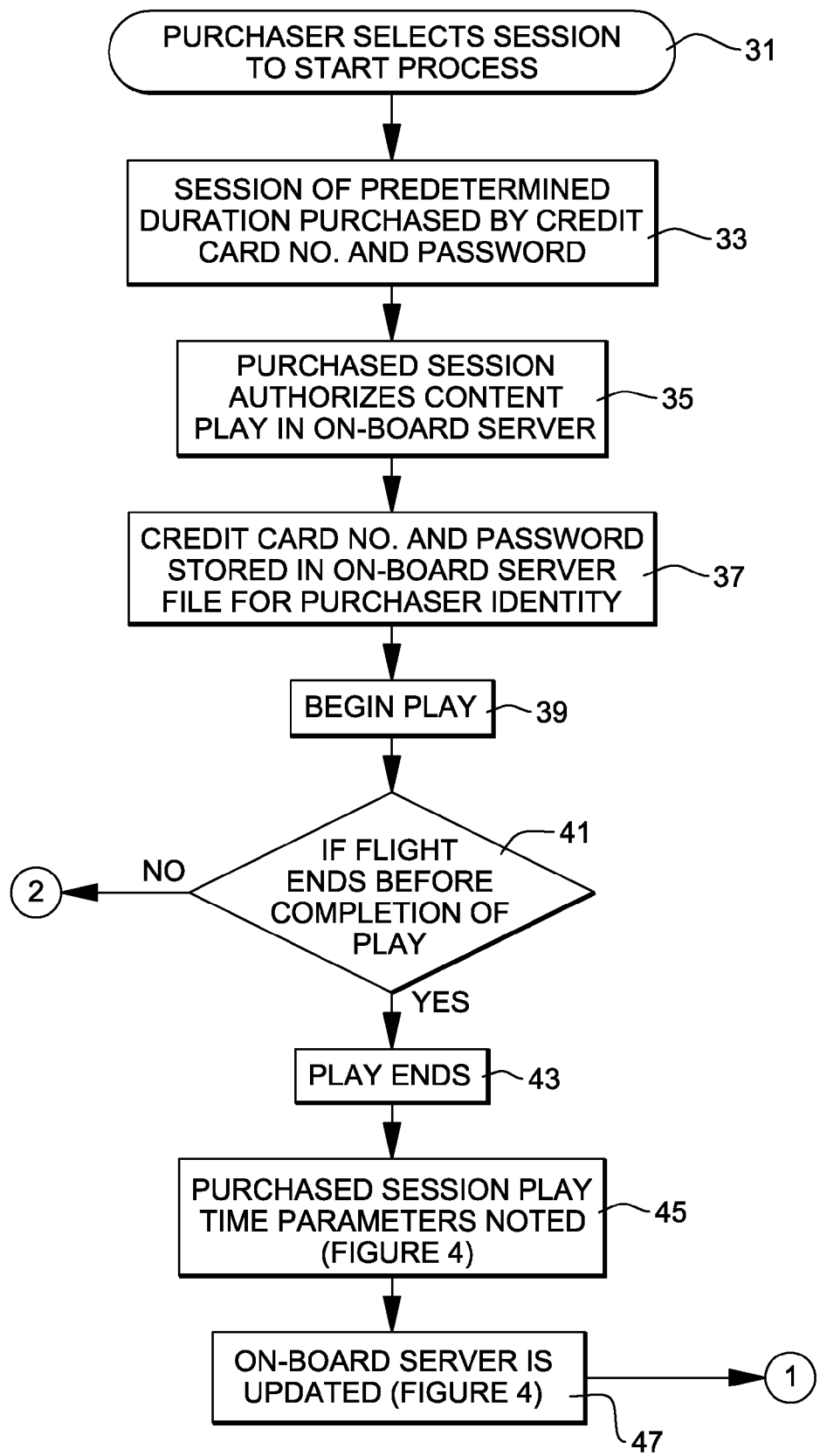
FIGS. 3A and 3B show a flow chart of the program steps used to carry out the process of preserving purchased on-demand transportation entertainment services across different journey segments or separate trips.
Figure 3B:
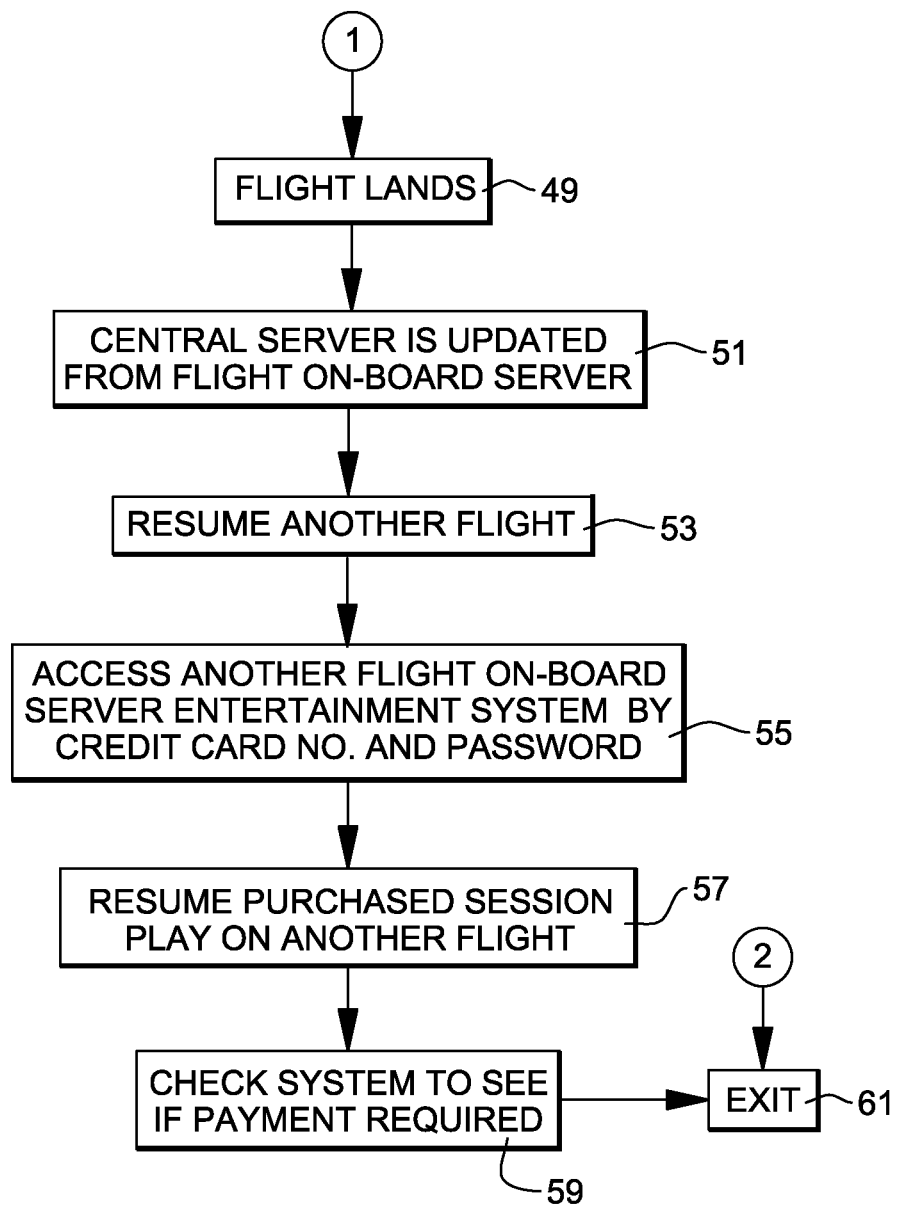

FIGS. 3A and 3B show a flow chart depicting the manner in which the application program operates to offer on-demand stored content, for example, that allows unused content to be saved for later access to continue play of the unused content.

As shown in FIG. 3A, the purchaser first selects a session, as shown by Block 31. This may be, for example, a particular film of predetermined play time selected via the terminal at the passenger seat. As shown by Block 33, the next step is for the purchaser to authorize payment by credit card number, for example. At this time, the purchaser may be prompted to select a password for future use. The film selected, credit card number and password, as well as any other relevant information, may be stored in a purchaser file, as shown by Block 37.

Upon authorizing purchase through the On-Board Server, the transaction acts to cause play to commence at the purchaser terminal. As previously mentioned, stored content may be within the on-board servers or may be in dedicated content servers controlled by the On-Board Server, as shown in FIG. 1. Thus, where content is in a dedicated content server, the authorized purchased session in the on-board server caused the content server to begin play of the purchased session at the purchaser terminal. This is shown by Block 39.

As shown by the step of Block 41, where the flight does not end before the completion of the purchased on-board service, such as a film, the process exits at 2. If the flight ends before the completion of the film, for example, film play automatically ends as a result of aircraft system control of the on-board server which, in turn, terminates the purchased film session, as shown by Block 43.

When play ends, the time used or expired of the session predetermined time period is noted, as taken from the stored content of the content server, and the remaining time of play is determined. This is shown by Block 45. The time parameters are used to restart the session play in the content server when the session is again accessed by the purchaser. The time parameters are stored in the purchaser file in the on-board server along with the identity of the session purchased, credit card number and password. The credit card number and password act as a unique identifier to be used later by the purchaser to again access the file to resume session play of the purchased session. Either the play time expired or the play time remaining may be used by another on-board server to cause content to resume play of the stored content in the content file of the purchased session in the content server at the point where play terminated.

Where a video game session is purchased, it is clear that in addition to storing time parameters, parameters noting the conditions or state of play a termination of play must be stored. More complex video games would require more state of play information to be stored.

With play time parameters noted at the step of Block 45 as determined from the session time elapsed in the stored content server, On-Board Server 9 (FIG. 1) is updated, as shown by Block 47. After the flight in question lands, as shown by Block 49, Central Ground-Based Server 11 (FIG. 1) is updated from the flight On-Board Server 9, (FIG. 1), as shown by flow-chart Block 51. All of the information in the purchaser file in the On-Board Server 9 is thus copied to Ground-Based Central Server 11.

When the purchaser resumes another flight on the same aircraft or another aircraft, as shown by Block 53, the purchaser may access the unused portion of the purchased content from the On-Board On-Demand Entertainment System. This is accomplished by using the credit card number and password used to access the on-board server in the initial flight to make the purchase of on-demand content.

Where the purchaser resumes another flight on another aircraft with another On-Board Server (On-Board Server 13 in FIG. 1) that has been updated by the Ground Based Central Server 11, the purchaser may resume play of the unused content (via credit card number and password) from that On-Board Server, which server may act to access an On-Board Content Server, such as On-Board Content Server 14 in FIG. 1, having the same content as On-Board Content Server 10 in FIG. 1. The latter steps are shown by Blocks 55 and 57 in FIG. 3B.

As shown by Block 59 in FIG. 3B, On-Board Server 13 in FIG. 1 may be programmed to determine if any payment is required either before resuming play or after play completion and before Exit 61. It is clear that additional features may be employed for providing the purchaser with a credit if play ends before the expiration of the predetermined period of play as initially purchased. Such feature could allow the purchaser to elect not to continue play on either the initial flight or another flight where purchaser, for example, realizes after a viewing a film for a few minutes, that the purchaser has already seen the film.

Figure 4:
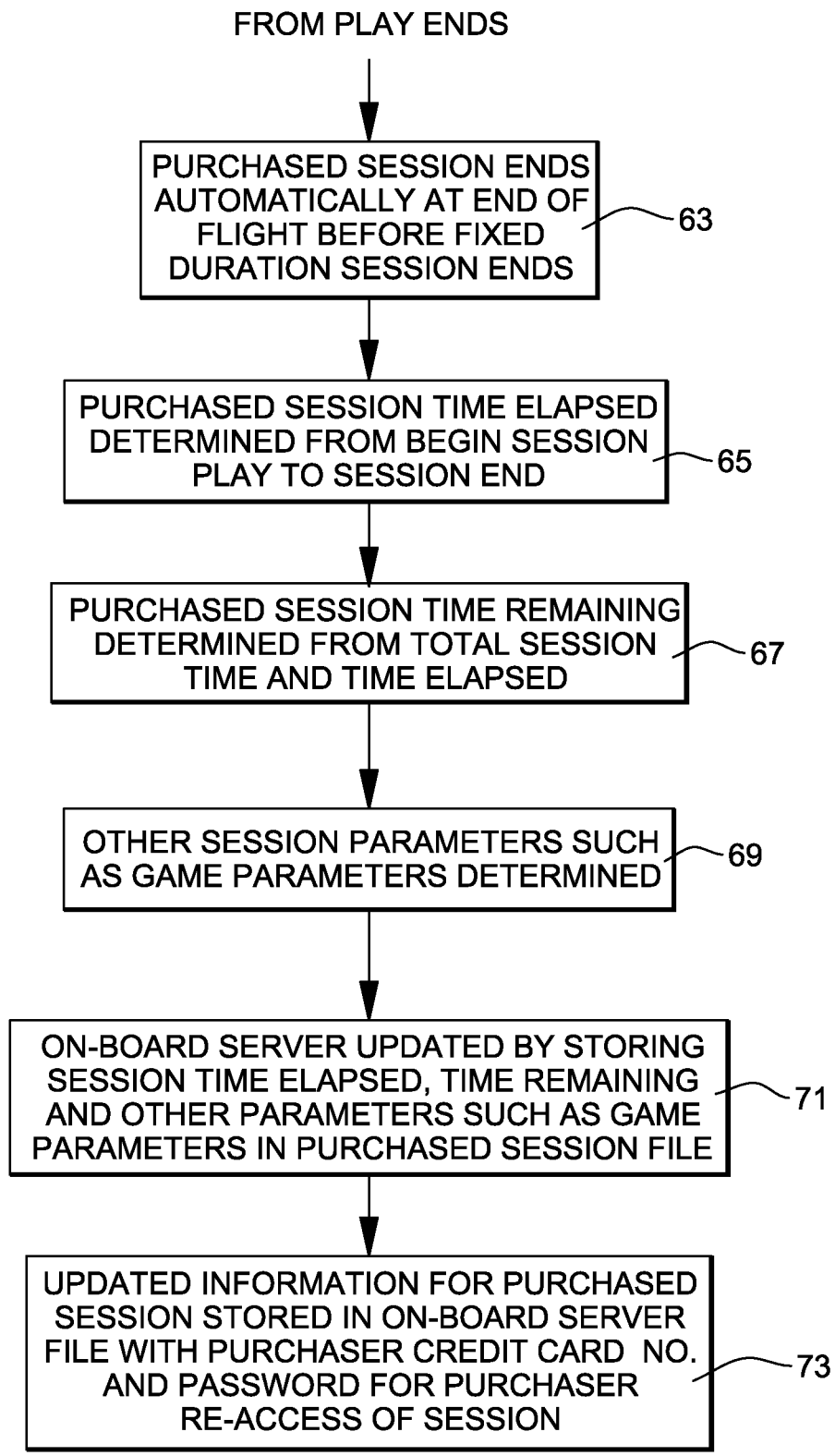
FIG. 4 shows a flow chart of the program steps used to transfer unused purchased on-demand entertainment session time from one trip segment to another trip segment or separate trip.

FIG. 4 shows in more detail process employed by On-Board Server 9 in FIG. 1. With the purchased session ending automatically at the end of flight before completion of play of the fixed or predetermined duration of the purchased session, as shown by Block 63, the time of play that elapsed to the point of automatic termination is determined at the step of Block 65 and the purchased session time remaining in determined at the step of Block 67. The later time may be used to provide credit, for example. Either of these time parameters, i.e. the play time elapsed or the play time remaining, may be used to access the content file the purchased content on another flight.

As shown by the step of Block 69, other parameters, such as, various game parameters conditions or state at termination of the session, time of day, date, etc. may also be determined.

As shown by the step of Block 71 these game parameters, along with the time parameters mentioned above, are stored in the purchaser file in On-Board Server 9 in FIG. 1 along with the identity of the content purchased, the purchaser's credit card number and password and any other relevant information.

With the purchaser file in On-Board Server 9 of FIG. 1 updated with this information as shown by Block 73, the purchaser file is ready for reaccess of the purchased session on another future flight by the purchaser. As previously pointed out in FIG. 3B, this is carried out by entering the purchaser's credit card number and password into the passenger seat terminal on the another flight to access another On-Board Server, such as, On-Board Server 13 in FIG. 1. As also previously pointed out, the purchaser file in On-Board Server 9 in FIG. 1 is sent to ground-based Central Server 11 which, in turn, is used to update On-Board Server 13 in another aircraft.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of preserving the amount of unused time of an on-demand service session provided to user terminals at passage seats on transportation vehicles through an on-board server computer programmed to provide such service in a server network, said on-board server computer further programmed to carry out the steps of:

authorizing purchase of play of an on-demand service session of predetermined play time duration from said on-board server computer on a transportation vehicle through a user terminal using a unique identifier;

storing said play time duration purchased, the identity of said purchased on-demand service session and said unique identifier in a user file in said on-board server computer;

commencing play of said on-demand service session of predetermined play time duration on said user terminal received from said on-board server computer;

terminating play on said user terminal from said on-board server computer before the end of said on-demand service session of predetermined play time duration;

determining the amount of play time remaining in said on-demand service session of predetermined play time duration using said predetermined time duration of said service session and the point in time in said session when said session is terminated;

storing said amount of play time remaining in said on-demand service session of predetermined play time duration in said user file in said on-board server computer;

sending the information in said user file stored in said on-board server computer, including said play time duration purchased, said play time remaining, the identity of said purchased on-demand service session and said unique identifier to a central server;

resending said information in said user file from said central server to another on-board computer server on a transportation vehicle for resuming play; and resuming play of said amount of time remaining in said on-demand service session of predetermined play time duration by accessing said user file associated with said unique identifier in said another on-board server computer through a user terminal using said unique identifier.

2. The method of claim 1 wherein said on-demand service session of predetermined play time duration is authorized on an airline passenger flight.

3. The method of claim 2 wherein said session of predetermined play time duration is terminated at the end of said an airline passenger flight before the end of said session of predetermined time duration.

4. The method of claim 2 wherein said step of resuming play of said unused time of said session by accessing said user file in said another on-board server computer using said unique identifier acts to continue said session at the point in time where said session was terminated to allow use of at least some of said unused time of said session in another airline passenger flight.

5. The method of claim 4 wherein said step of commencing play and said step of resuming play are carried out by said on-board server computer and said another on-board server computer using an on-board content server.

6. The method of claim 5 wherein said another airline passenger flight is the same flight as said an airline passenger flight.

7. The method of claim 5 wherein play on said user terminal on said another airline passenger flight is terminated before the end of said on-demand service session of predetermined play time duration and the amount of play time remaining in said on-demand service session is stored in said on-board computer.

8. A computer program product for preserving the amount of unused time of an on-demand service provided to a user, said program product comprising:

a non-transitory computer readable storage medium having instructions to preserve the amount of unused on-demand service time remaining;

the non-transitory computer readable storage medium comprising:

a program instruction for authorizing from a local server the purchase of play of an on-demand service session of predetermined play time duration in response to receiving a unique identifier;

a program instruction for storing said play time duration purchased, the identity of said purchased on-demand service session and said unique identifier in a user file in said local server;

a program instruction for commencing play of said on-demand service session of predetermined play time duration;

a program instruction for terminating play before the end of said on-demand service session of predetermined play time duration;

a program instruction for determining the amount of time remaining in said session of predetermined time duration;

a program instruction for storing said amount of play time remaining in said on-demand service session of predetermined play time duration in said user file in said local server;

a program instruction for sending from said local server the information in said user file including play time duration purchased, play time remaining, the identity of said purchased on-demand service session and said unique identifier to a central server;

a program instruction for receiving in another local server said information in said user file in said central server for resuming play;

a program instruction for resuming play of said amount of time remaining in said on-demand service session of predetermined play time duration by accessing said user file associated with said unique identifier in said another local server using said unique identifier; and wherein said program instructions are stored on said non-transient computer readable storage medium.

9. The computer program product of claim 8 wherein said program instructions for authorizing and resuming play of an on-demand service session of predetermined play time duration is executable on airline flights by on-board local servers.

10. The computer program product of claim 9 wherein said program of instruction for terminating play before the end of said on demand session of predetermined play time duration is executable at the end of said flight before the end of said session of predetermined play time duration.

11. The computer program product of claim 10 wherein said program instruction for resuming play of said amount of time remaining in said on-demand service session is carried out by accessing said user file using said unique identifier in said another local server and acts to commence play in said session at the point in time where said session was terminated so as to allow use of at least a portion of the said time remaining in said session in another flight.

12. The computer program product of claim 11 wherein said program instruction for resuming play is carried out in said another flight which is a different flight than said an airline flight where purchase of on-demand service was authorized.

13. The computer program product of claim 12 including a program instruction for receiving the content of said authorized on-demand service from said another local server.

* * * * *